March 10, 1970   A. PFEUFFER   3,499,667
HOSE CLAMP
Filed Oct. 21, 1968   4 Sheets-Sheet 1
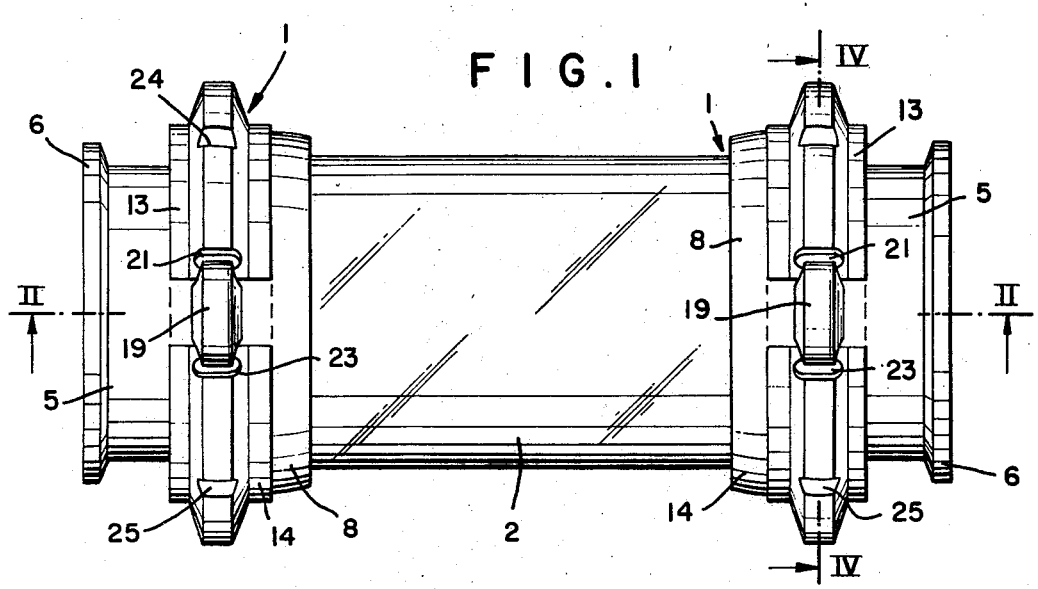
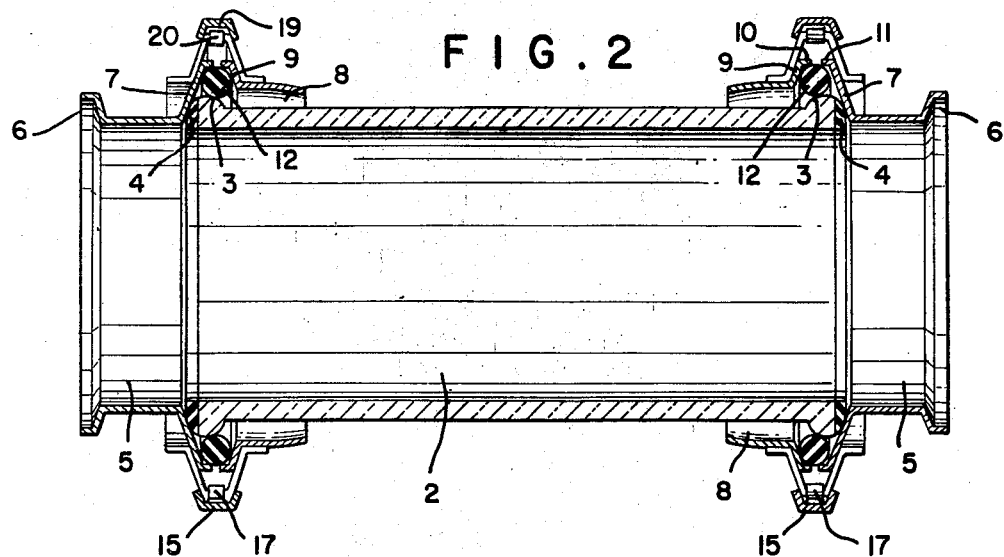
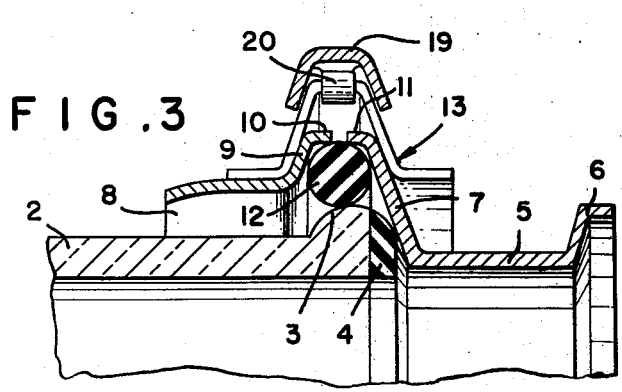
INVENTOR.
ANTON PFEUFFER
BY Nolte and Nolte
ATTORNEYS March 10, 1970     A. PFEUFFER     3,499,667

HOSE CLAMP

Filed Oct. 21, 1968     4 Sheets-Sheet 2

INVENTOR.
ANTON PFEUFFER
BY Nolte and Nolte
ATTORNEYS

March 10, 1970  A. PFEUFFER  3,499,667
HOSE CLAMP

Filed Oct. 21, 1968  4 Sheets-Sheet 3

INVENTOR.
ANTON PFEUFFER
BY
Nolte and Nolte
ATTORNEYS

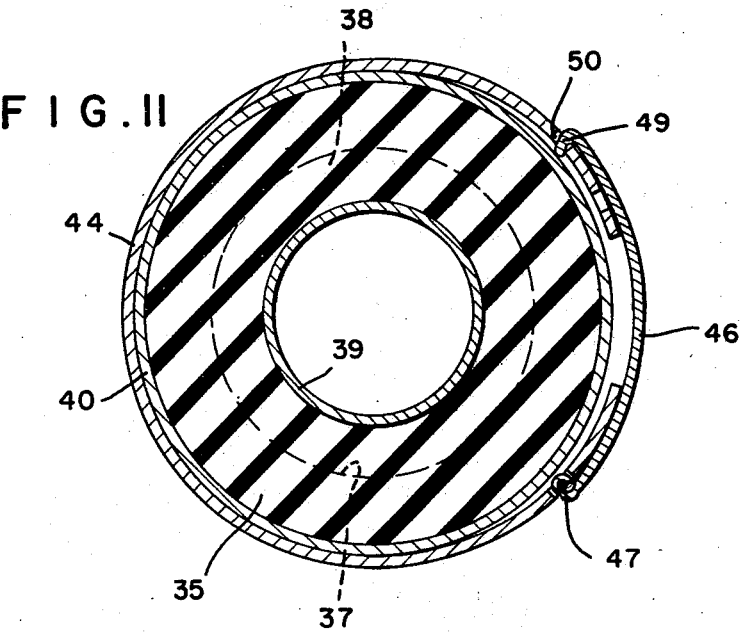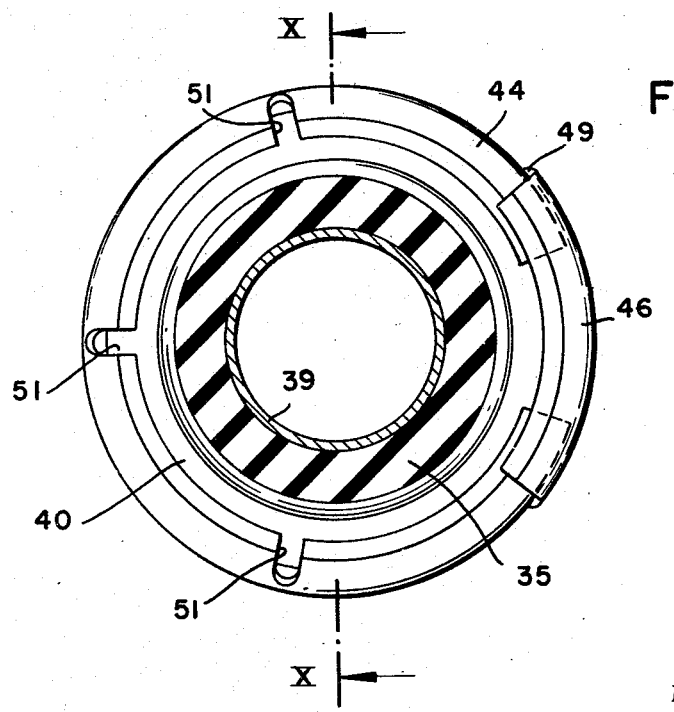

United States Patent Office 3,499,667
Patented Mar. 10, 1970

1

3,499,667
HOSE CLAMP
Anton Pfeuffer, 301 E. 78th St., New York, N.Y. 10021
Continuation-in-part of application Ser. No. 567,662,
July 25, 1966. This application Oct. 21, 1968, Ser.
No. 768,986
Int. Cl. F16l 55/00, 35/00
U.S. Cl. 285—93                                    3 Claims

ABSTRACT OF THE DISCLOSURE

Conduit clamping devices for connecting the ends of similar or dissimilar tubular conduits designed to exert pressure on the outside surfaces of the conduit ends and/or on sealing elements associated therewith to provide liquid-tight joints, the clamping device being closeable with the aid of a suitable tool and openable, each clamping device comprising one or more arcuate channels connected by one or more links which, when in place, are free from objectionable projections.

---

This application is a continuation-in-part of Ser. No. 567,662, filed July 25, 1966, now abandoned.

Various methods and apparatus for joining pipe and tubes are known wherein the lengths of pipes to be joined are prepared and brought together, and wherein fittings engage the ends and are screwed or bolted together, thereby clamping the ends of the pipes together to form an integral joint. Known pipe clamps consist of a clamp body, rivets, bolts and nuts, all of which are fitted together and adjusted by means of known tools. Many of the known type of clamps include swivel portions taking the form of riveted connections which permit the opening of the mouth of the clamp so as to receive and envelop pipes.

In applications such as industrial piping, the material and labor costs of installing piping and tubing runs often constitute the major cost of the installation. Efforts have been made to reduce the time required for joining prepared ends of piping so as to provide fluidtight joints in relatively short periods of time.

In order to accomplish these ends, present methods involve the use of many tools and the use of clamping apparatus which consists of many parts. As a result, the joining of two ends of pipe often requires the efforts of more than one person, with a resulting increase in labor costs in the case of industrial installations.

Further disadvantages of known clamps include undesirable projections which not only present a safety hazard but also create a special fitting problem when installing pipe joints that are to be covered with external insulation. Time-consuming preparations involving the cutting of blanket insulation will often result in undesirable increases in installation costs. In addition, in the case of known bolted clamps, separate tools are required to engage the bolt and nut respectively when tightening clamp. This is often a problem when working in areas that are not easily accessible.

An object of the present invention is to provide an improved clamp wherein undesirable projections are eliminated and the overall dimensions are smaller, thereby producing a joint which is safe to work near and more presentable in appearance.

A further object of the present invention is to provide a relatively inexpensive clamp which is adapted for use with a locking tool, and wherein a relatively short period of time is required for installation.

The present invention fulfills the aforementioned objects and overcomes the limitations and disadvantages of prior art solutions. In one embodiment, two ends of pipe to be joined are brought into an abutting relationship so that their longitudinal axes coincide. The ends of the pipes may be swaged, flared or beveled depending upon the type of joint desired. A clamp and gasket arrangement is placed around the ends, and a locking tool is caused to engage the clamp so that a lever type action on the locking tool will cause the clamp to constrict the gasket and pipe ends.

A locking clip, preferably carried by one end of the clamp, is then moved into position to prevent relaxation of the pressure on the joint, and the tool may be removed leaving the clamp in position.

Practical embodiments of the invention are shown in the accompanying drawings wherein:

FIG. 1 represents an elevation of a sight glass connected at each end to coupling members by means of clamps according to the invention;

FIG. 2 represents an axial section on the line II—II of FIG. 1;

FIG. 3 represents section, on an enlarged scale, corresponding to the upper right hand corner of FIG. 2;

FIG. 9 represents a transverse section on the line IX—IX of FIG. 8;

FIG. 11 represents a transverse section on the line XI—XI of FIG. 8.

Figure 4:
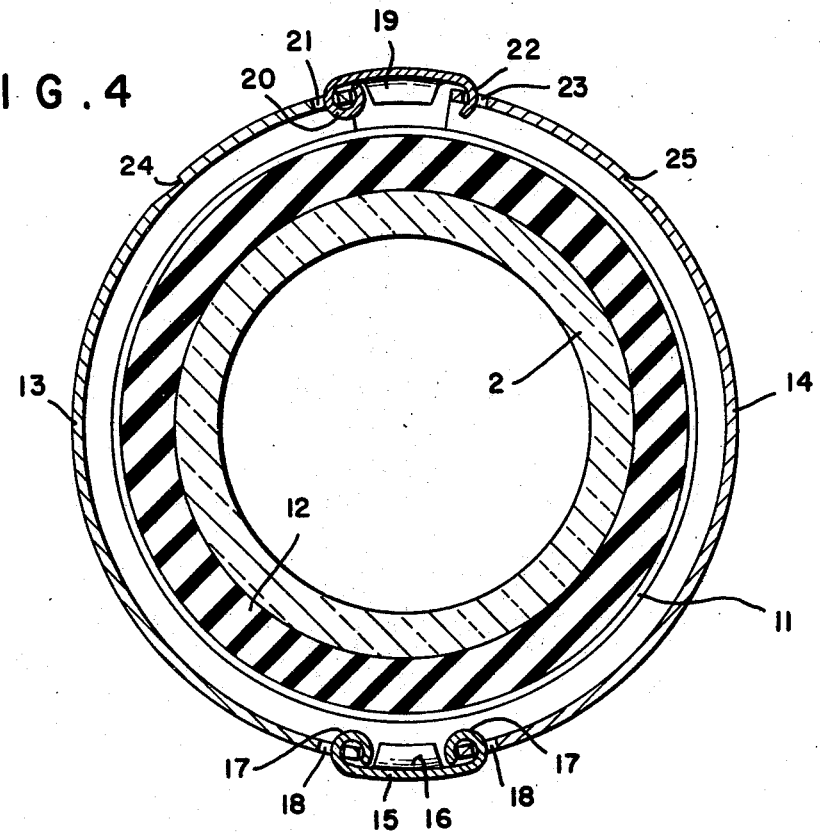
FIG. 4 represents a transverse section on the line IV—IV of FIG. 1.
Figure 5:
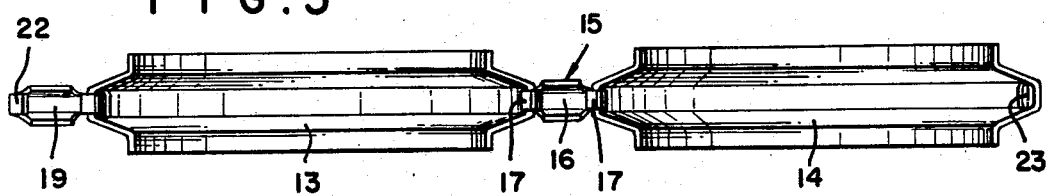
FIG. 5 represents a plan view of the clamp of FIGS. 1 to 4 laid out with its inner side exposed.

Referring to FIGS. 1 to 4, the conduit connecting clamp 1 is shown in connection with a sight glass assembly, designed to permit visual observation of the flow of material through a conduit in which the assembly is interposed. The glass tube 2 is provided with external rounded beads 3 around each end, each end being flattened in the radial plane and a thin annulus of resilient packing material 4 being affixed to the flat surface. The metal coupling member 5, having a cylindrical body portion, is formed with a short outwardly flaring shoulder 6 around one end and a wider outwardly flaring shoulder 7 around the end to be attached to the glass tube. A metal ferrule 8 has its least diameter large enough to permit it to pass over the bead 3 and tapers outwardly at 9 to match the shoulder 7, the ferrule and shoulder each terminating in a short cylindrical rim 10, 11, respectively, and the space between bead 3, ferrule and shoulder 7 being occupied by an O-ring 12.

The parts just described are held together by the clamp 1 which is constituted by a pair of arcuate channels 13, 14, of inwardly flaring cross-section, permanently joined by a link 15, the middle part of which is an inwardly facing channel 16 and the ends 17 of which are looped through slots 18 in adjacent ends of the channels 13, 14.

At the free end of channel 13 a similar link 19 is permanently attached by having one end 20 looped through a slot 21 in channel 13. The free end 22 of link 19 is bent inward through somewhat more than 90° to form a hook designed to be engaged in a slot 23 near the free end of the channel 14.

The channels 13, 14 are provided, near their free ends, with notches 24, 25 (FIGS. 1 and 4) having radial walls facing away from the free ends so that they may be engaged by a suitable tool and the free ends thus drawn toward each other.

The coupling member 5 is connected to the sight glass 2 by slipping the ferrule 8 onto the end of the glass (past the bead 3), placing the O-ring 12 within the flaring portion 9 of the ferrule and bearing against the bead, bringing the shoulder of the member 5 into position against the packing material 4 and O-ring, closing the channel sections 13, 14 around the ferrule and member 5 and drawing the free ends of the channels together sufficiently to permit engagement of the hook 22 in the slot 23. The clamp assembly must be rather accurately sized for each particular installation, but minor irregularities are accommodated by variations in the degree of compression of the O-ring and packing material. A range of sizes for the clamp assembly can be provided by having available replacement links of greater or less length to be substituted for links 15 and/or 19. It will be understood that the free end of each coupling member 5 may be connected, with the aid of the shoulder 6, to a flanged end of a metal pipe or to any other suitably formed conduit terminus.

Figure 6:
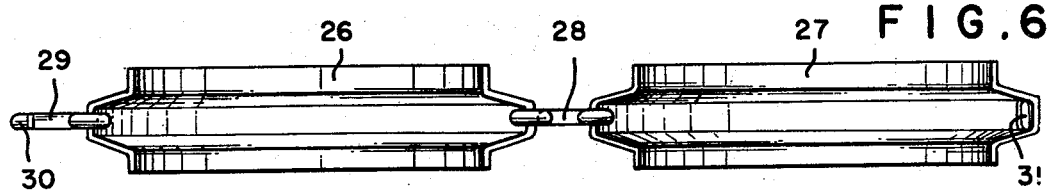
FIG. 6 represents a plan view, as in FIG. 5, of a modified form of clamp.
Figure 7:
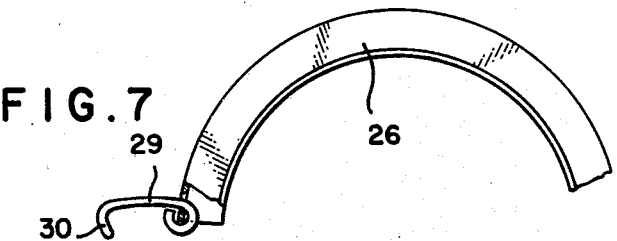
FIG. 7 represents a detail elevation of the left end of the clamp shown in FIG. 6.
Figure 10:
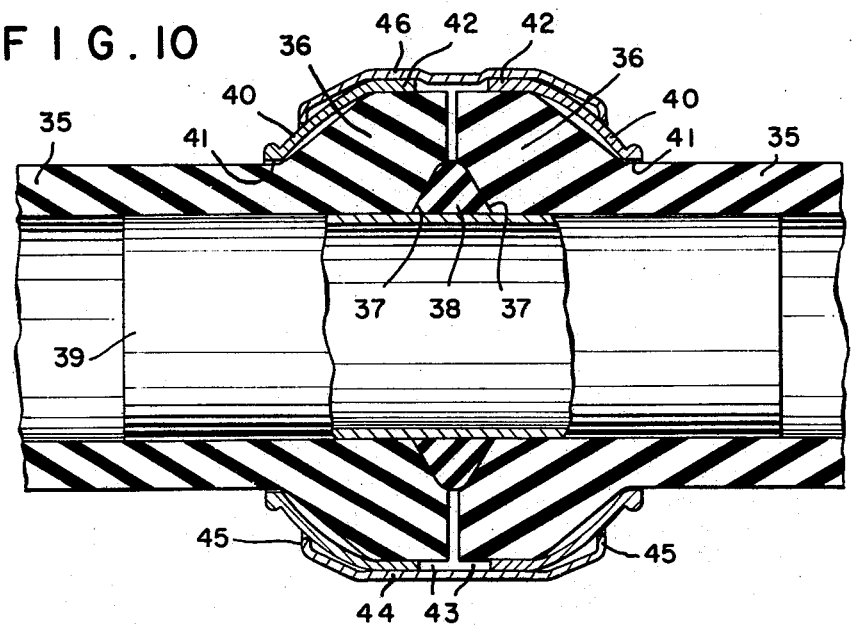
FIG. 10 represents an axial section of the line X—X of FIG. 9.
Figure 8:
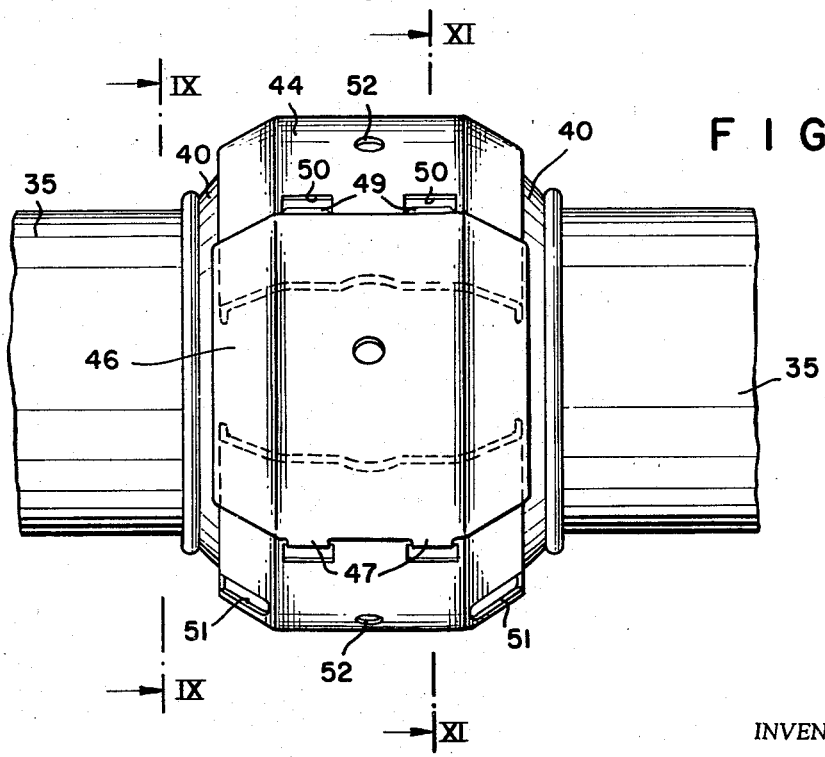
FIG. 8 represents an elevation of a modified form of clamp, applied to the flanged ends of two hose sections.

The modified form of clamp shown in FIGS. 6 and 7 includes channel sections 26, 27 generally similar to channels 13, 14, but linked together by a round wire link 28 the ends of which are looped through holes in adjacent ends of the channels. At the free end of channel 26 a wire link 29 is permanently attached, the free end of the link being bent through more than 90° to form a hook 30 designed for engagement in a hole 31 adjacent the free end of channel 27 when the clamp is applied as described above.

In the sight glass mounting described above there is a double seal in that the shoulder 7 bears against the packing material 4, while the O-ring is pressed against the bead 3 by the outer zones of the ferrule 8 and shoulder 5 within the space defined by the rims 10, 11. It will also be noted that no metal part touches the glass, thus minimizing danger of breakage.

FIGS. 8 to 11 illustrate the adaptation of a similar clamp to the connection of heavy duty hose ends such, for instance, as those used in certain brewing operations. The hose sections 35 are shown as being thickened adjacent their ends to form flanges 36, the inner lip of each flanged end being cut away, as indicated at 37, to form an annular recess within which may be placed a compressible sealing ring 38. The joint area is internally reinforced by the provision of a sleeve 39 (e.g. of stainless steel) fitting snugly within the bore of each hose end and extending a short distance beyond the flanged area.

Around each flange 36 is fitted a metal ferrule 40 having a minor diameter at the edge 41 only slightly greater than the diameter of the hose and flaring outward to a cylindrical rim 42 which fits snugly around the outer surface of the flange, but terminates a short distance from the end of the hose, as indicated at 43.

The parts just described are secured tightly together by means of the clamping band 44, having a cross-sectional form of a wide channel with inturned edges 45 designed to bear against the sloping outer surfaces of the ferrules 40 when the band is contracted by a suitable tool, such as a strap wrench. The band 44 has attached near one end a locking link 46, the attachment being effected, for instance, by a pair of hooks 47 engaged in openings 48 in the band. The free end of the link is provided with a pair of hooks 49 (similar in profile to the hook 22 in FIG. 4) adapted to be engaged in pairs of openings 50 adjacent the free end of the band 44. Two or more pairs of openings 50 may be provided, so that the hooks 49 can be engaged in whichever pair will ensure the greatest tightness of the band around the ferrules. The band 44 is preferably provided with slots 51 at suitable intervals, extending from each edge across at least a major part of the sloping sides of the band in order to permit sufficient flexion of the band for snapping it onto the hose and around the ferrules. The link 46 is described as being attached to one end of the band, which is convenient and prevents it from being lost or mislaid. The holes 52 may be engaged by a suitable tool for closing the clamp around a hose joint, as an alternative to the use of a strap wrench, the holes 52 serving the same function as the notches 24, 25 in FIGS. 1 and 4.

The joint formed by means of the clamping assembly of FIGS. 8 to 11 involves a wedging action which creates a very tight seal between the sleeve 39, sealing ring 38 and beveled ends 37 of the hoses to be joined.

What I claim is:

1. In combination, a conduit clamping device for connecting ends of two conduits, one of said ends being flared and the other being provided with an integral relatively thick flange, two arcuate members formed with a radially inwardly flaring channel adapted to overlie the ends of the conduits to be connected, two adjacent ends of said members being permanently linked together, at least one separate axially flaring member interposed between the conduit flange and the arcuate members, a link carried by the free end of one arcuate member and engageable with the free end of the other arcuate member for holding said arcuate members in clamping relation to the conduit ends and the axially flaring member, the separate axially flaring member being formed similarly to the flared conduit end, the confronting surfaces of said flaring member and said flared conduit converging radially outwardly, said flaring member and said flared conduit end having diameters substantially greater than the diameter of said conduit flange, and an annular body of sealing material engaging said flared conduit end and said flaring member and the outer periphery of said conduit flange.

2. A conduit clamping device according to claim 1 in which the conduit provided with a flange is a sight glass.

3. A conduit clamping device according to claim 2 which includes a second annular body of sealing material between said flange and said flared conduit.

References Cited

UNITED STATES PATENTS

| | | | |
|---|---|---|---|
| 2,219,161 | 10/1940 | Jacobs | 285—365 |
| 2,602,678 | 7/1952 | Mahoff et al. | 285—367 X |
| 2,879,084 | 3/1959 | Staiger | 285—367 X |
| 3,178,206 | 4/1965 | Martin et al. | |
| 3,432,189 | 3/1969 | Buller | 285—366 X |

FOREIGN PATENTS

| | | |
|---|---|---|
| 378,640 | 8/1907 | France. |
| 1,009,141 | 5/1957 | Germany. |
| 744,046 | 2/1956 | Great Britain. |

THOMAS F. CALLAGHAN, Primary Examiner

U.S. Cl. X.R.

285—233, 238, 365